United States Patent

Patel

[15] 3,703,705

[45] Nov. 21, 1972

[54] MULTI-CHANNEL SHIFT REGISTER

[72] Inventor: Arvind M. Patel, Wappingers Falls, N.Y.

[73] Assignee: International Business Machines Corporation, Armonk, N.Y.

[22] Filed: Dec. 31, 1970

[21] Appl. No.: 103,205

[52] U.S. Cl...................340/146.1 AL, 340/146.1 BE

[51] Int. Cl................................................G06f 11/12

[58] Field of Search.340/146.1, 146.1 AL, 146.1 BE; 235/153

[56] References Cited

UNITED STATES PATENTS

| | | |
|---|---|---|
| 3,452,328 | 6/1969 | Hsiao et al........340/146.1 AL |
| 3,465,287 | 9/1969 | Kennedy et al...340/146.1 AL |
| 3,601,800 | 8/1971 | Lee ..................340/146.1 AL |

OTHER PUBLICATIONS

Hsiao and Sih, Serial-to-Parallel Transformation of Linear-Feedback Shift-Register Circuits, IEEE Transactions of Electronic Computers, Dec. 1964 (EC-13), pp. 738-740.

Hsiao, Single-Channel Error Correction in an f-Channel System, IEEE Transactions on Computers, Vol. C-17, NO. 10, October 1968, pp. 935-943.

*Primary Examiner*—Charles E. Atkinson

*Attorney*—Hanifin & Jancin and Harold H. Sweeney, Jr.

[57] ABSTRACT

A linear feedback shift register for operating on a plurality f of parallel inputs according to a generator polynomial to produce encoding and decoding is provided having a plurality r of shift register stages $X_0 \ldots X_{r-1}$ each corresponding to one of the terms in the generator polynomial. A first plurality of modulo 2 addition means connect, for modulo 2 addition, each of said f data bit inputs $Z_{t+f-1}, Z_{t+f-2}, \ldots, Z_{t+1}, Z_t$ of the shift register to the output of an individual one of the last f register stages $X_{r-f}, X_{r-f+1}, \ldots, X_{r-1}$ according to the relationship $Z_{t+f-1}$ to $X_{r-f}$, $Z_{t+f-2}$ to $X_{r-f+1}, \ldots, Z_t$ to $X_{r-1}$. A second plurality of modulo 2 addition means are connected to the respective inputs of the first $X_{r-f+2}$ shift register stages. The first feedback connection from the output of each of said first plurality of modulo 2 addition means in said f shift register stages is connected to each of two preceding second modulo 2 addition means in accordance with the relationship $X_{r-f+1}$ to $X_1$ and $X_2$; $X_{r-f+2}$ to $X_2$ and $X_3$; $X_{r-1}$ to $X_{r-f+1}$ and $X_{r-f+2}$. A third modulo 2 addition means connects each output of the first plurality of modulo 2 addition means to the register stages determined in accordance with the non-zero coefficients in the generator polynomial.

7 Claims, 2 Drawing Figures

INVENTOR
ARVIND M. PATEL

BY [signature]
ATTORNEY

MULTI-CHANNEL SHIFT REGISTER

BACKGROUND OF THE INVENTION

This invention relates to a linear feedback shift register and, more particularly, to an improved feedback shift register for processing bytes of data wherein the bits are processed in parallel.

It is known that binary data in the form of a message can be checked after utilization or transmission for errors. It is also known that a shift register can be utilized to perform the encoding of the transmitted data and the decoding of the received data. The shift register is mechanized in accordance with a particular selected generator polynomial. The generator polynomial determines the feedback connections to be made in the shift register so as to provide a division of the incoming binary message polynomial by the generator polynomial. The result of the division is a remainder which is defined as the checking character. For each different binary message, there is a unique combination of a quotient plus a remainder. This remainder, by itself, carries enough error detection information that it alone is transmitted as the check bits. As can be seen by analogy to decimal division, the remainder varies cyclically over the range of message polynomials. For this reason, these codes are called "cyclic codes." Because of this cyclic property, messages with the same check bit pattern are kept numerically remote from each other. There are well known rules for selecting the generator polynomial to give particular detecting and correcting properties.

In the decoding of the transmitted message, an identical shift register is used. The message is divided by the same generator polynomial to obtain the remainder. If the message has been transmitted correctly, the remainder should be the same as the remainder generated in the encoding shift register. U.S. Pat. No. 3,465,287, issued to Joseph C. Kennedy and John H. Sorg, Jr. on Sept. 2, 1969 discloses a multi-channel feedback shift register mechanized so as to encode and decode cyclic codes wherein the data bits are processed in parallel.

It is an object of the present invention to provide an improved multi-channel feedback shift register for processing parallel data.

It is another object of the present invention to provide a multi-channel shift register for processing parallel input data wherein the input binary message is applied at the higher order stages of the feedback shift register.

It is a further object of the present invention to provide a multi-channel feedback shift register wherein the hardware is simplified by partitioning of the state vector of the shift register.

Briefly, the above objects of this invention are accomplished by providing a parallel input feedback shift register for encoding and decoding a binary message wherein a plurality of shift register stages r are connected in accordance with the expression:

$$X_{t+f} = X^1_t\,(O \mid I_{r-f}) \oplus (X^2_t \oplus Z_t)\,(D)$$

where:

$$X_{t+f} = (x_0, X_1, \ldots, x_{r-1})_{t+f}$$

denotes the contents of the shift register at time $t+f$ where $f$ is equal to the number of parallel channels:

$$X^1_t = (x_0, x_1, \ldots, x_{r-f-1})$$

$$X^2_t = (x_{r-f}, x_{r-f+1}, \ldots, X_{r-1})$$

denotes the partitioning of the state vector $X_t$;

$$Z_t = (z_{t+f-1}, z_{t+f-2}, \ldots, z_{t+1}, Z_t)$$

denotes the input data sequence;

$$[O \mid I_{r-f}]$$

is a matrix of $(r-f)$ rows and $r$ columns where the first $f$ columns are O's and the next $(r-f)$ columns are an $(r-f)$ identity matrix; and $$D = \begin{bmatrix} G \\ \hline GT \\ \hline \cdot \\ \cdot \\ \cdot \\ \hline GT^{f-1} \end{bmatrix}$$

where G is the vector:

$$[G_0, G_1, G_2, \ldots, G_{r-1}]$$

which is obtained from the generator polynomial $G(x) = G_0 \oplus G_1 x \oplus G_2 x^2, \ldots, G_r x^r$
and T is given by:

$$T = \left[\begin{array}{c|c} 0 & \\ 0 & I_{r-1} \\ \cdot & \\ \cdot & \\ \hline \multicolumn{2}{c}{G_0, G_1, \ldots, G_{r-1}} \end{array}\right]$$

and matrix $T^f$ is the $f^{th}$ power of the matrix T.

The invention has the further advantage that the parallel shift register generated in accordance with the above connections is capable of processing f bits in parallel.

The invention has the further advantage that it is operable upon any detection code available to serial feedback shift register circuits.

The foregoing and other objects, features and advantages of the invention will be apparent from the following more particular description of a preferred embodiment of the invention as illustrated in the accompanying drawings.

Figure 1:
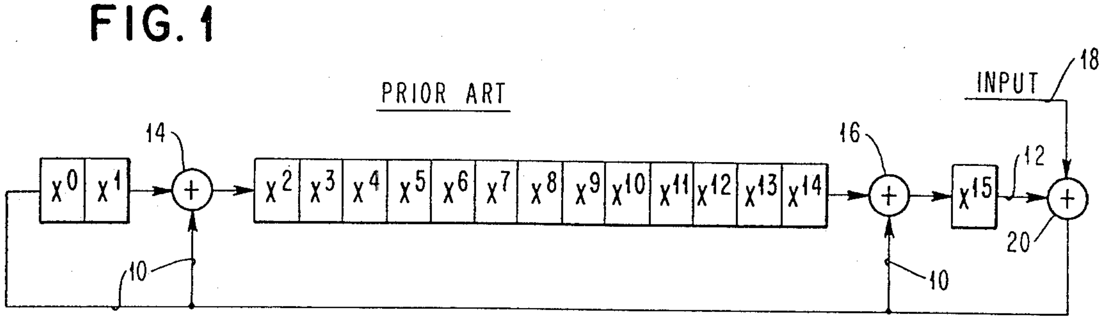
FIG. 1 is a schematic diagram of a prior art serial feedback shift register adapted for encoding or decoding.

The serial shift register circuit shown in FIG. 1 is designed on the bases of the checking or generator polynomial $1 + x^2 + x^{15} + x^{16}$. The generator polynomial determines the feedback connections 10 that are made from the output 12 of the serial shift register to the inputs of various shift register stages. For example, the output 12 of the shift register is connected to the initial shift register stage $x_0$. It is also connected to an EXCLUSIVE OR circuit 14 prior to the $x^2$ stage. Likewise, the feedback is connected to an EXCLUSIVE OR circuit 16 just prior to the $x^{15}$ shift register stage. These EXCLUSIVE OR circuits have as the other input thereto the input from the immediately preceding shift register stage. It should be noted that the input 18 to the shift register is at the high order end of the shift register rather than the low order end as was the case in the previously mentioned U.S. Pat. No. 3,465,287. The input 18 is connected to an EXCLUSIVE OR circuit 20 with the output of the last shift register stage of the shift register which, in this example, is $x^{15}$ connected as the other input thereto. Even though the input 18 to the shift register is at the high order end, the contents of the shift register is still shifted towards the high order end from the low order end. Thus, when the last bit of the message sequence is entered, the contents of the shift register represents the check character or remainder. Actually, the connection of the shift register provides a division of the inputted binary message by the generator polynomial $G(x)$ which, as previously mentioned, is $1 + X^2 + x^{15} + x^{16}$ in the FIG. 1 example. The remainder of this division is the checking character which remains in the register. The serial shift register of FIG. 1 has 16 stages, designated by the letter X with a superscript number indicating the place of the corresponding term in the generator polynomial. It should be noted that the non-zero terms in the generator polynomial are represented in the linear feedback shift register by register stages having a connection from a feedback line while the 0 co-efficient terms in the polynomial are represented by register stages that do not have a direct feedback connection.

The same shift register can be used for decoding. The received message bits are entered into the shift register at the input 18 at the high order end similar to the shift when used for encoding. The check character generated in the encoding shift register is also shifted into the decoder shift register. When the last bit of the check character is entered, the contents of the decoding shift register represents the syndrome. A non-zero syndrome indicates an error in the receive data.

Assuming a binary message 16 bits in length as follows:

1 1 0 1 0 1 1 1 1 0 0 1 0 0 1 1 is processed in the shifting register of FIG. 1, the following table defines the various transition states of the register:

TABLE I.—STATE TRANSITION TABLE FOR SERIAL SHIFT REGISTER

| | | Contents of Shift Register | | | | | | | | | | | | | | | |
|---|---|---|---|---|---|---|---|---|---|---|---|---|---|---|---|---|---|
| Time t | Input | $x^0$ | $x^1$ | $x^2$ | $x^3$ | $x^4$ | $x^5$ | $x^6$ | $x^7$ | $x^8$ | $x^9$ | $x^{10}$ | $x^{11}$ | $x^{12}$ | $x^{13}$ | $x^{14}$ | $x^{15}$ |
| 0 | | 0 | 0 | 0 | 0 | 0 | 0 | 0 | 0 | 0 | 0 | 0 | 0 | 0 | 0 | 0 | 0 |
| 1 | 1 | 1 | 0 | 1 | 0 | 0 | 0 | 0 | 0 | 0 | 0 | 0 | 0 | 0 | 0 | 0 | 1 |
| 2 | 1 | 0 | 1 | 0 | 1 | 0 | 0 | 0 | 0 | 0 | 0 | 0 | 0 | 0 | 0 | 0 | 0 |
| 3 | 0 | 0 | 0 | 1 | 0 | 1 | 0 | 0 | 0 | 0 | 0 | 0 | 0 | 0 | 0 | 0 | 0 |
| 4 | 1 | 1 | 0 | 1 | 1 | 0 | 1 | 0 | 0 | 0 | 0 | 0 | 0 | 0 | 0 | 0 | 1 |
| 5 | 0 | 1 | 1 | 1 | 1 | 1 | 0 | 1 | 0 | 0 | 0 | 0 | 0 | 0 | 0 | 0 | 1 |
| 6 | 1 | 0 | 1 | 1 | 1 | 1 | 1 | 0 | 1 | 0 | 0 | 0 | 0 | 0 | 0 | 0 | 0 |
| 7 | 1 | 1 | 0 | 0 | 1 | 1 | 1 | 1 | 0 | 1 | 0 | 0 | 0 | 0 | 0 | 0 | 1 |
| 8 | 1 | 0 | 1 | 0 | 0 | 1 | 1 | 1 | 1 | 0 | 1 | 0 | 0 | 0 | 0 | 0 | 0 |
| 9 | 1 | 1 | 0 | 0 | 0 | 0 | 1 | 1 | 1 | 1 | 0 | 1 | 0 | 0 | 0 | 0 | 1 |
| 10 | 0 | 1 | 1 | 1 | 0 | 0 | 0 | 1 | 1 | 1 | 1 | 0 | 1 | 0 | 0 | 0 | 1 |
| 11 | 0 | 1 | 1 | 0 | 1 | 0 | 0 | 0 | 1 | 1 | 1 | 1 | 0 | 1 | 0 | 0 | 1 |
| 12 | 1 | 0 | 1 | 1 | 0 | 1 | 0 | 0 | 0 | 1 | 1 | 1 | 1 | 0 | 1 | 0 | 0 |
| 13 | 0 | 0 | 0 | 1 | 1 | 0 | 1 | 0 | 0 | 0 | 1 | 1 | 1 | 1 | 0 | 1 | 0 |
| 14 | 0 | 0 | 0 | 0 | 1 | 1 | 0 | 1 | 0 | 0 | 0 | 1 | 1 | 1 | 1 | 0 | 1 |
| 15 | 1 | 0 | 0 | 0 | 0 | 1 | 1 | 0 | 1 | 0 | 0 | 0 | 1 | 1 | 1 | 1 | 0 |
| 16 | 1 | 1 | 0 | 1 | 0 | 0 | 1 | 1 | 0 | 1 | 0 | 0 | 0 | 1 | 1 | 1 | 0 |
| Check character | | 1 | 0 | 1 | 0 | 0 | 1 | 1 | 0 | 1 | 0 | 0 | 0 | 1 | 1 | 1 | 0 |

Figure 2:
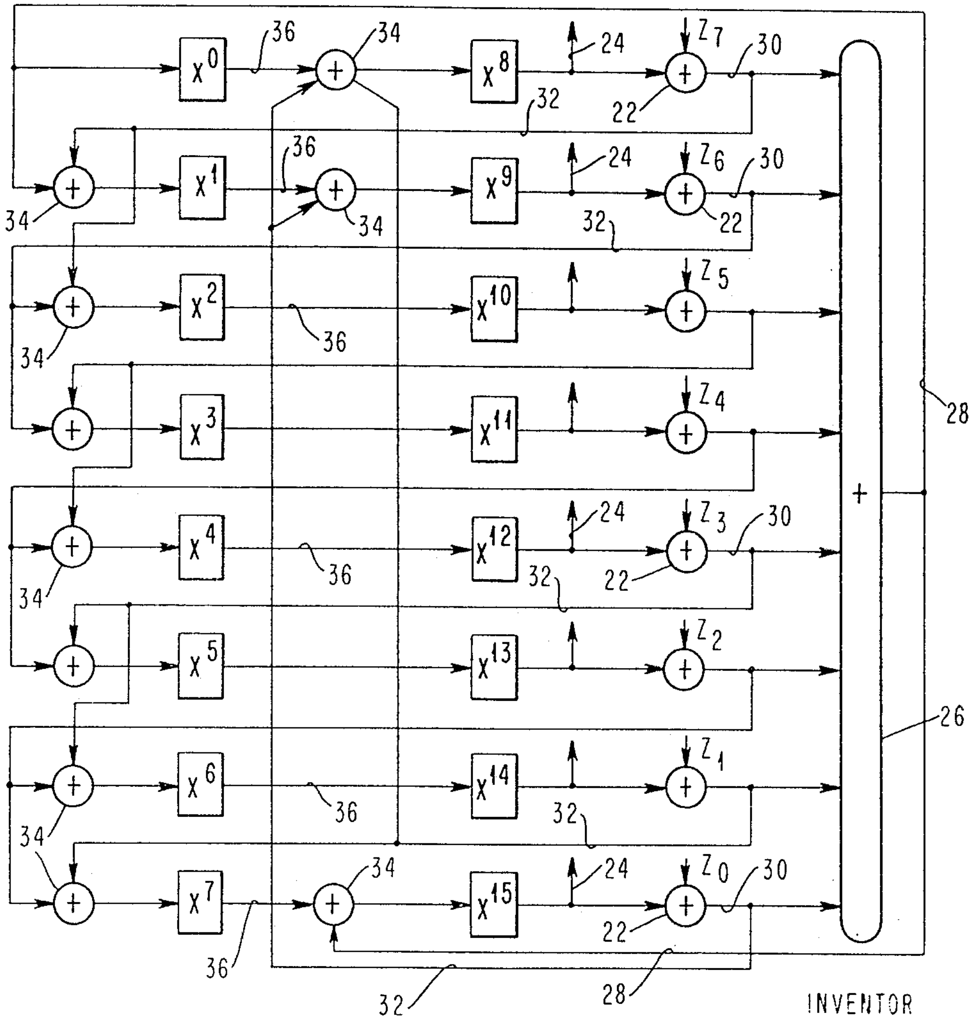
FIG. 2 is a schematic diagram of a multi-channel feedback shift register for encoding and decoding parallel input information.

In FIG. 2, there is shown a multi-channel feedback shift register that processes 8 bits in parallel which forms a byte of information. A single shift in this circuit with any 8 bit input sequence is equivalent to 8 consecutive shifts in the serial circuit of FIG. 1 with the same input sequence. The circuit is shown having an input binary sequence of 8 parallel bits $z_0, z_1, \ldots, z_7$. These inputs are each fed to a respective EXCLUSIVE OR circuit 22 associated with one of the higher order stages in the shift register. The $z_0$ input is fed to the EXCLUSIVE OR circuit 22 which has as the other input thereto the output of the shift register stage $x^{15}$. The inputs designated by successively increasing integers are fed to the shift register stages designated by successively decreasing integers. The output 24 of the shift register is also taken from the higher order stages of the register which, in the case being considered, are $x^8$ through $x^{15}$. The circuit is designed to utilize the same generator polynomial $1 + x^2 + x^{15} + x^{16}$ as was used to provide the division in the serial register of FIG. 1. It is apparent that the various connections and arrangement of the parallel shift register stages cannot be easily deduced form the serial shift register arrangement.

Table II which follows is the State Transition Table of the Multi-Channel Feedback Shift Register of FIG. 2 when processing the same binary message, namely:

1 1 0 1 0 1 1 1 1 0 0 1 0 0 1 1 as was processed through the shift register of FIG. 1,

TABLE II.—STATE TRANSITION TABLE OF THE MULTI-CHANNEL FEEDBACK SHIFT REGISTER

| | Input | | | | | | | | Contents of shift register | | | | | | | | | | | | | | | |
|---|---|---|---|---|---|---|---|---|---|---|---|---|---|---|---|---|---|---|---|---|---|---|---|---|
| Number of the shift | $z^0$ | $z^1$ | $z^2$ | $z^3$ | $z^4$ | $z^5$ | $z^6$ | $z^7$ | $x^0$ | $x^1$ | $x^2$ | $x^3$ | $x^4$ | $x^5$ | $x^6$ | $x^7$ | $x^8$ | $x^9$ | $x^{10}$ | $x^{11}$ | $x^{12}$ | $x^{13}$ | $x^{14}$ | $x^{15}$ |
| | | | | | | | | | 0 | 0 | 0 | 0 | 0 | 0 | 0 | 0 | 0 | 0 | 0 | 0 | 0 | 0 | 0 | 0 |
| 1 | 1 | 1 | 0 | 1 | 0 | 1 | 1 | 1 | 0 | 1 | 0 | 0 | 1 | 1 | 1 | 1 | 0 | 1 | 0 | 0 | 0 | 0 | 0 | 0 |
| 2 | 1 | 0 | 0 | 1 | 0 | 0 | 1 | 1 | 1 | 0 | 1 | 0 | 0 | 1 | 1 | 0 | 1 | 0 | 0 | 0 | 1 | 1 | 1 | 0 |
| Check character | | | | | | | | | 1 | 0 | 1 | 0 | 0 | 1 | 1 | 0 | 1 | 0 | 0 | 0 | 1 | 1 | 1 | 0 |

shown in Table I. The binary message in the parallel shift register is handled in the form of 2 bytes:

(1 1 0 1 0 1 1 1) and (1 0 0 1 0 0 1 1)

The first byte consists of the first half (8) of the bits of the 16-bit message. Each successive bit of the byte corresponding to the $z_0 \ldots z_7$ inputs to the register. The result is that the parallel circuit of FIG. 2 produces the same check character as that produced by the circuit of FIG. 1 but 8 times faster. It will be appreciated from this Table that the same check character is arrived at in 2 shifts, each shift being caused by the input of an 8-bit byte in parallel as described above. As can be seen in FIG. 2, the shift register stages $x^{0\,0} \ldots x^{15}$ are arranged in two groups $x^0 \ldots x^7$ and $x^8 \ldots x^{15}$. The outputs of the first group $x^0 \ldots x^7$ are fed to the shift register stages that are successively 8 channels away. For example, the output 36 of the $x^0$ register stage is fed to an EXCLUSIVE OR circuit 34 preceding the $x^8$ stages. Likewise, the output 36 of the $x^1$ stage is fed to the EXCLUSIVE OR circuit 34 preceding the $x^9$ stage. This sequence of connections continues with the output of the $x^7$ stage being connected as an input to the $x^{15}$ stage of the shift register. The outputs of the second group of shift register stages $x^8 \ldots x^{15}$ are fed directly to EXCLUSIVE OR circuits 22 as one of the inputs along with the message bit inputs $z_7 \ldots z_0$, respectively. The output 30 from each of these EXCLUSIVE OR circuits 22 is also connected via a feedback connection 32 to the succeeding two shift register channels. For example, the output 30 of the $x^8$ shift register stage is fed from the EXCLUSIVE OR circuit 22 back to an EXCLUSIVE OR circuit 34 preceding each of the $x^1$ and $x^2$ stages. Likewise, the output 30 of the EXCLUSIVE OR circuit 22 following the shift register stage $x^9$ is fed back to the EXCLUSIVE OR circuits 34 preceding the $x^2$ and $x^3$ adjacent shift register stages. This sequence of connections continues with the EXCLUSIVE OR circuit 22 following the $x^{15}$ shift register stage being connected to the EXCLUSIVE OR circuits 34 preceding the $x^8$ and $x^9$ stages. The output of the modulo 2 adder or EXCLUSIVE OR circuits 22 are fed into a common EXCLUSIVE OR circuit 26 which has the one output 28. The output connection 28 of the common EXCLUSIVE OR circuit 26 is connected as an input to the $x^0$ shift register stage in the first group of shift register stages and is also connected to the EXCLUSIVE OR circuit 34 preceding the $x^1$ stage. This same output 28 from the common EXCLUSIVE OR circuit 26 is fed as an input to the EXCLUSIVE OR circuit 34 which precedes the $x^{15}$ stage. These conditions are determined by the connection matrix D, where D will be derived hereafter from the generator polynomial.

In order to better understand the operation as well as the various connections that must be made in constructing a particular feedback shift register for encoding and decoding, the general design thereof will be expressed mathematically. Thus, the multi-channel feedback shift register has $f$ channels and is capable of processing $f$ bits in parallel to generate in the encoding mode the check character and to generate, in the decoding mode, the syndrome. It will be appreciated, that one shift in the parallel circuit is equivalent to $f$ shifts in the corresponding serial shift register discussed above. The number $f$ is a positive integer, smaller than the degree $r$ of the generator polynomial which is selected. The generator polynomial or checking polynomial is denoted by:

$$G(x) = G_0 + G_1x + G_2x^2 + \ldots + G_r x^r \qquad (1)$$

The stage vector $X_t = (x_0, x_1, \ldots, x_{r-1})_t$ denotes the contents of the shift register circuit at time $t$. The companion matrix of the polynomial G(x) is denoted by T. The particular companion matrix T shown here is the companion matrix for the connections given in the serial shift register previously described. Let $Z_t$ denote the data bit entering the serial shift register at time $t$. Then, the shifting operation of the serial shift register is given by the modulo 2 matrix equation:

$$X_{t+1} = X_t T \oplus Z_t G \qquad (2)$$

where G is the vector $(G_0, G_1, G_2, \ldots, G_{r-1})$ and T is given by:

$$T = \begin{bmatrix} 0 & 1 & 0 & \ldots & 0 \\ 0 & 0 & 1 & \ldots & 0 \\ & & \cdot & & \\ & & \cdot & & \\ & & \cdot & & \\ 0 & 0 & 0 & \ldots & 1 \\ G_0 & G_1 & G_2 & \ldots & G_{r-1} \end{bmatrix} \qquad (3)$$

Assuming that $Z_t, Z_{t+1}, \ldots, Z_{t+f-1}$ are the f data bits (a byte) entering successively into the serial shift register during the f consecutive shifting operations. The contents of the shift register at the end of $f$ shifts is denoted by the vector $X_{t+f}$. Using equation (2) iteratively, $f$ times, the equation is obtained as follows:

$$X_{t+f} = X_t T^f \oplus z_t G T^{f-1} \oplus z_{t+1} G T^{f-2} \oplus \ldots z_{t-f-1} G \qquad (4)$$

In this equation $T^j$ is the $j^{th}$ power of the matrix T. Letting $Z_t$ denote the input data sequence as follows:

$$Z_t = (z_{t+f-1}, z_{t+f-2}, \ldots, z_{t-1}, z_t)$$

Let D denote the following partitioned matrix:

$$D = \begin{bmatrix} G \\ \hline GT \\ \hline GT^2 \\ \hline \cdot \\ \cdot \\ \cdot \\ \hline GT^{f-1} \end{bmatrix} \qquad (5)$$

Then, equation (4) can be rewritten as:

$$X_{t+f} = X_t T^f \oplus Z_t D \qquad (6)$$

The parallel circuit realized from equation (6) has the property that with an input byte $Z_t$ ($f$ bits in parallel), it changes from state $X_t$ to $X_{t+f}$ in a single shift. This is the equivalent operation to f shifts of the corresponding serial shift register with the same input data entered serially.

The matrix T can be partitioned as follows:

$$T = \begin{bmatrix} 0 \mid I_{r-1} \\ \hline G \end{bmatrix} \qquad (7)$$

where $I_r$ is the $r \times r$ identity matrix. In general, it can be shown that $T^f$ is equal to the following partitioned matrix:

$$T^f = \begin{bmatrix} 0 \mid I_{r-f} \\ \hline D \end{bmatrix} \qquad (8)$$

where D is given by equation (5) above. The D matrix can be obtained by the following method using the example given in the serial shift register discussion above where the generator polynomial $1 + x^2 + x^{15} + x^{16}$ is used. Noting that the vectors G, GT, $GT^2$, . . . ,$GT^{f-1}$ represents the contents of the serial shift register as the vector G is shifted $f-1$ times. Table III lists these vectors for the generator polynomial example. The matrices D and $T^f$ can be obtained using Table III and equations (5) and (8). It should be noted that the implementation of the equation (6) produces a parallel circuit. The matrix $T^f$ contains D as a sub-matrix. It has been found that proper partitioning of the state vector results in considerable savings in hardware in the parallel version of the feedback shift register. The state vector can be partitioned into two parts:

of the shift register to the output of an individual one of the last f register stages:

$$x_{r-f}, x_{r-f+}, \ldots, x_{r-1}$$

according to the relationship:

$$z_{t+f-1} \text{ to } x_{r-f},\ z_{t+f-2} \text{ to } x_{r+f-1}, \ldots, 2_t \text{ to } x_{r-1};$$

a second plurality of modulo 2 addition means connected to respective inputs of the first $x_{r-f+2}$ shift register stages;

a first feedback connection from the output of each of said first plurality of modulo 2 addition means in said f shift register stages to each of two preceding second modulo 2 addition means in accordance with the relationship:

TABLE III.—ROWS OF THE MATRIX D

Contents of the Serial CRC Register

| Number of the shift | | $x^0$ | $x^1$ | $x^2$ | $x^3$ | $x^4$ | $x^5$ | $x^6$ | $x^7$ | $x^8$ | $x^9$ | $x^{10}$ | $x^{11}$ | $x^{12}$ | $x^{13}$ | $x^{14}$ | $x^1$ |
|---|---|---|---|---|---|---|---|---|---|---|---|---|---|---|---|---|---|
| 0 | G | 1 | 0 | 1 | 0 | 0 | 0 | 0 | 0 | 0 | 0 | 0 | 0 | 0 | 0 | 0 | 1 |
| 1 | GT | 1 | 1 | 1 | 1 | 0 | 0 | 0 | 0 | 0 | 0 | 0 | 0 | 0 | 0 | 0 | 1 |
| 2 | $GT^2$ | 1 | 1 | 0 | 1 | 1 | 0 | 0 | 0 | 0 | 0 | 0 | 0 | 0 | 0 | 0 | 1 |
| 3 | $GT^3$ | 1 | 1 | 0 | 0 | 1 | 1 | 0 | 0 | 0 | 0 | 0 | 0 | 0 | 0 | 0 | 1 |
| 4 | $GT^4$ | 1 | 1 | 0 | 0 | 0 | 1 | 1 | 0 | 0 | 0 | 0 | 0 | 0 | 0 | 0 | 1 |
| 5 | $GT^5$ | 1 | 1 | 0 | 0 | 0 | 0 | 1 | 1 | 0 | 0 | 0 | 0 | 0 | 0 | 0 | 1 |
| 6 | $GT^6$ | 1 | 1 | 0 | 0 | 0 | 0 | 0 | 1 | 1 | 0 | 0 | 0 | 0 | 0 | 0 | 1 |
| 7 | $GT^7$ | 1 | 1 | 0 | 0 | 0 | 0 | 0 | 0 | 1 | 1 | 0 | 0 | 0 | 0 | 0 | 1 |

$$X_t = (x_t^1 \mid X_t^2) \qquad (9)$$

where:

$$X_t^1 = (x_0, X_1, \ldots, x_{r-f-1})_t \qquad (10)$$

$$X_t^2 = (x_{r-f}, x_{r-f+1}, \ldots, x_{r-1})_t \qquad (11)$$

Using equations (8) and (9), the equation (6) can be rewritten as follows:

$$X_{t+f} = X_t^1\,(0|I_{r-f}) \oplus (X_t^2 \oplus Z_t)\,(D) \qquad (12)$$

The implementation of equation (12) produces the parallel circuit of FIG. 2. Thus, it should be appreciated that with any polynomial G(x) degree r, parallel feedback shift register can be generated which processes f bits in parallel ($f \leq r$). It should also be appreciated that the hardware can be minimized by the proper partitioning of the matrices in the state transition equation for the parallel circuit. In the situation where $f > r$, the theory can be applied without any change, except that the partitioning will be applied to the D matrix rather than to the $T^f$ matrix. This is observable since D, in this case, contains $T^f$ as one of its partitions.

While the invention has been particularly shown and described with reference to a preferred embodiment thereof, it will be understood by those skilled in the art that various changes in form and detail may be made without departing from the spirit and scope of the invention.

What is claimed is:

1. A linear feedback shift register for operating on a plurality f of parallel inputs according to a generator polynomial to produce a check character comprising:

a plurality r of shift register stages $X_0 \ldots X_{r-1}$ each corresponding to one of the terms in the generator polynomial;

a first plurality of modulo 2 addition means connecting, for modulo 2 addition, each of said $f$ data bit inputs:

$$Z_{t+f-1}, z_{t-f+2}, \ldots, 2_{t-1}, z_t$$

$x_{r-f+1}$ to $x_1$ and $x_2$, $x_{r-f+2\ 2}$ $x_2$ and $x_3$, . . . ,$x_{r-1}$ to $x_{r-f+1}$ and $x_{r-f+A\infty 2}$; and a third modulo 2 addition means connecting each output of said first plurality of modulo 2 addition means to the register stages determined in accordance with the non-zero coefficients in the generator polynomial.

2. A linear feedback shift register according to claim 1 wherein said second plurality of modulo 2 addition means connected to the respective inputs of the first $x_{r-f+2}$ shift register stages performs modulo 2 addition on the pair of said first feedback connections from adjacent pairs of said first modulo 2 addition means.

3. A linear feedback shift register according to claim 1, wherein said third modulo 2 addition means connects each output of said first plurality of modulo 2 addition means to a fourth modulo 2 addition means in the input of the register stages determined in accordance with the non-zero coefficients in the generator polynomial.

4. A linear feedback shift register according to claim 3, wherein said second plurality of modulo 2 addition means connected to the input of the first $x_{r-f+2}$ shift register stages has a feedback input from the third modulo 2 addition means determined in accordance with the non-zero coefficients in the generator polynomial thereby serving as the modulo 2 adder for the second and fourth modulo 2 addition means.

5. A linear feedback shift register according to claim 1, wherein the shift register output is taken from the output of the last f register stages:

$$x_{r-f}, x_{r-f+1}, \ldots x_{r+1} \text{syndrome}$$

6. A linear feedback shift register according to claim 1, wherein the remainder in said shift register following a shift register operation on a message input is fed into an identical shift register used for decoding following said message utilization to thereby produce an error syndrom which should equal 0 if there is no error in the utilized message.

7. A linear feedback shift register according to claim 1, wherein said plurality $r$ of shift register stages $X_0 \ldots X_{r-1}$ are connected in accordance with the expression:

$$X_{t-f} = x_t^1 (0 \mid I_{r-f}) \oplus (X_t^2 \oplus Z_t)(D)$$

where:

$$X_{t+f} = (x_0, x_1, \ldots, x_{r+1})_{t-f}$$

denotes the contents of the shift register at time t+f where f is equal to the number of parallel channels and $f \leq r$;

$$x_t^1 = (x_0, x_1, \ldots, x_{r-f-1})_t$$

$$X_t^2 = (x_{r-f}, x_{r-f-1}, \ldots, x_{r-1})_t$$

represents the partioning f the shift register;

$$(0 \mid I_{r-f})$$

is a matrix of $(r\text{-}f)$ rows and r columns where the first $f$ columns are 0's and the next $(r\text{-}f)$ columns are a $(r\text{-}f)$ identity matrix which defines the connections corresponding to the first partition $X_t^1$ of the register;

$Z_t$ denotes the input data sequence;

$Z_t = (z_{t+f-1}, z_{t+f-2}, \ldots, z_{t+1}, Z_t)$ and D denotes the partioned matrix:

$$D = \begin{bmatrix} G \\ \hline GT \\ \hline GT^2 \\ \hline \cdot \\ \hline \cdot \\ \hline \cdot \\ \hline GT^{t-1} \end{bmatrix}$$

where G is the vector:

$$(G_0, G_1, G_2, \ldots, G_{r-1})$$

which is obtained from the generator polynomial:

$$G(x) = G_0 \oplus G_1 x \oplus G_2 x^2, \ldots, G_r x^r$$

and T and $T^f$ are matrices defined as follows:

$$T = \begin{bmatrix} 0 \mid & I_{r-1} \\ \hline G_0 G_1 G_2 \ldots & G_{r-1} \end{bmatrix}$$

and $T^f$ is the $f^{th}$ power of the matrix T.

* * * * *